United States Patent [19]

Mizuno et al.

[11] Patent Number: 5,250,765

[45] Date of Patent: Oct. 5, 1993

[54] APPARATUS FOR CONTROLLING ELEVATOR DOOR

[75] Inventors: Masamoto Mizuno; Terumi Hirabayashi; Masanori Tawada; Toshiyuki Kodera, all of Inazawa, Japan

[73] Assignee: Mitsubishi Denki Kabushiki Kaisha, Tokyo, Japan

[21] Appl. No.: 713,095

[22] Filed: Jun. 11, 1991

[30] Foreign Application Priority Data

Jun. 25, 1990 [JP] Japan .................. 2-155354

[51] Int. Cl.$^5$ .................................................. B66B 13/14
[52] U.S. Cl. .......................................... 187/103; 187/31; 187/52 R; 187/104; 318/257; 318/282; 318/626
[58] Field of Search ............... 187/103, 104, 30, 31, 187/47, 48, 51, 52, 52 LC; 318/271, 272, 257, 281, 282, 286, 466, 468, 626, 801, 802

[56] References Cited

U.S. PATENT DOCUMENTS

| | | | |
|---|---|---|---|
| 4,305,481 | 12/1981 | Hmelovsky et al. | 187/29 R |
| 4,776,433 | 10/1988 | Lagree et al. | 187/103 |
| 5,131,506 | 7/1992 | Mizuno et al. | 187/103 |
| 5,144,101 | 9/1992 | Tawada et al. | 187/103 |
| 5,162,711 | 11/1992 | Heckler | 318/264 |
| 5,170,865 | 12/1992 | Mizuno et al. | 187/103 |

FOREIGN PATENT DOCUMENTS

| | | | |
|---|---|---|---|
| 64-3794 | 1/1989 | Japan . | |
| 0163282 | 6/1990 | Japan | 187/104 |
| 3-152084 | 6/1991 | Japan | 187/104 |

Primary Examiner—Steven L. Stephan
Assistant Examiner—Thomas M. Dougherty
Attorney, Agent, or Firm—Leydig, Voit & Mayer

[57] ABSTRACT

An apparatus for controlling an elevator door comprises a motor for opening and closing an elevator door, an inverter unit for controlling the driving of the motor, a door position detecting unit for detecting the position of the door, first and second sensors for respectively detecting that the door passes through a terminal reference point on the opening side and a terminal reference point on the closing side, a speed command generating unit for generating a speed command on the basis of a distance between the door position detected by the door position detecting unit to a stop target on the opening side or the closing side when the first and second sensors respectively detect the passage of the door, and a control unit for controlling the inverter unit on the basis of the speed command output from the speed command generating unit.

9 Claims, 8 Drawing Sheets

APPARATUS FOR CONTROLLING ELEVATOR DOOR

BACKGROUND OF THE INVENTION

1. Field of the Invention

The present invention relates to an apparatus for controlling an elevator door in which the driving of a motor for opening and closing the elevator door is controlled by an inverter.

2. Description of the Related Art

Figure 7:
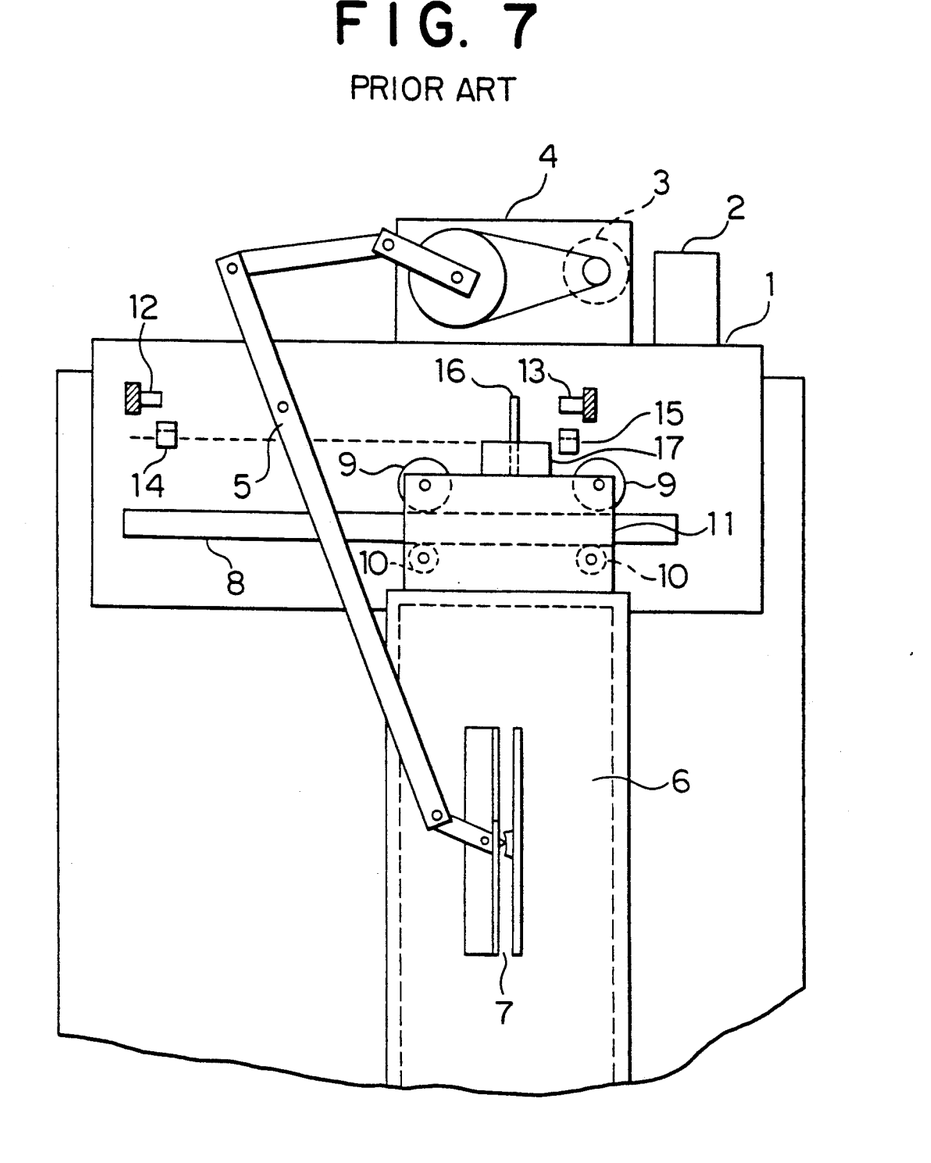
FIG. 7 is a schematic drawing showing the mechanical structure of a general elevator door system.

FIG. 7 shows a mechanical structure of a general elevator door system. In FIG. 7, the elevator door system comprises a hanger case 1, a door controlling unit 2, a door driving motor 3 connected to the door controlling unit 2, and a driving unit 4 fixed to the upper side of the hanger case 1 and containing the motor 3. A door 6 provided at the entrance of a cage is connected to the driving unit 4 through a four-throw driving link 5. On the door 6 are provided an engaging unit 7 which is engaged with the unit (not shown) provided on a door at a riding place within a door zone so as to link the door 6 to the door at each riding place, and a door hanger 11 which is moved by hanger rollers 9 and up thrust rollers 10 for guiding the door 6 to be opened and closed on a rail 8. The hanger case 1 is provided with a door stopper 12 at the opening end and a door stopper 13 on a closing end, both of which are made of an elastic material, as well as an OLT sensor 14 indicating an open state of the door 6 and a CLT sensor 15 indicating a closed state of the door 6. A door stopper 16 which strikes the door stoppers 12 and 13 and a fitting 17 for actuating the OLT sensor 14 and the CLT sensor 15 are also fixed to the door hanger 11.

Figure 8:
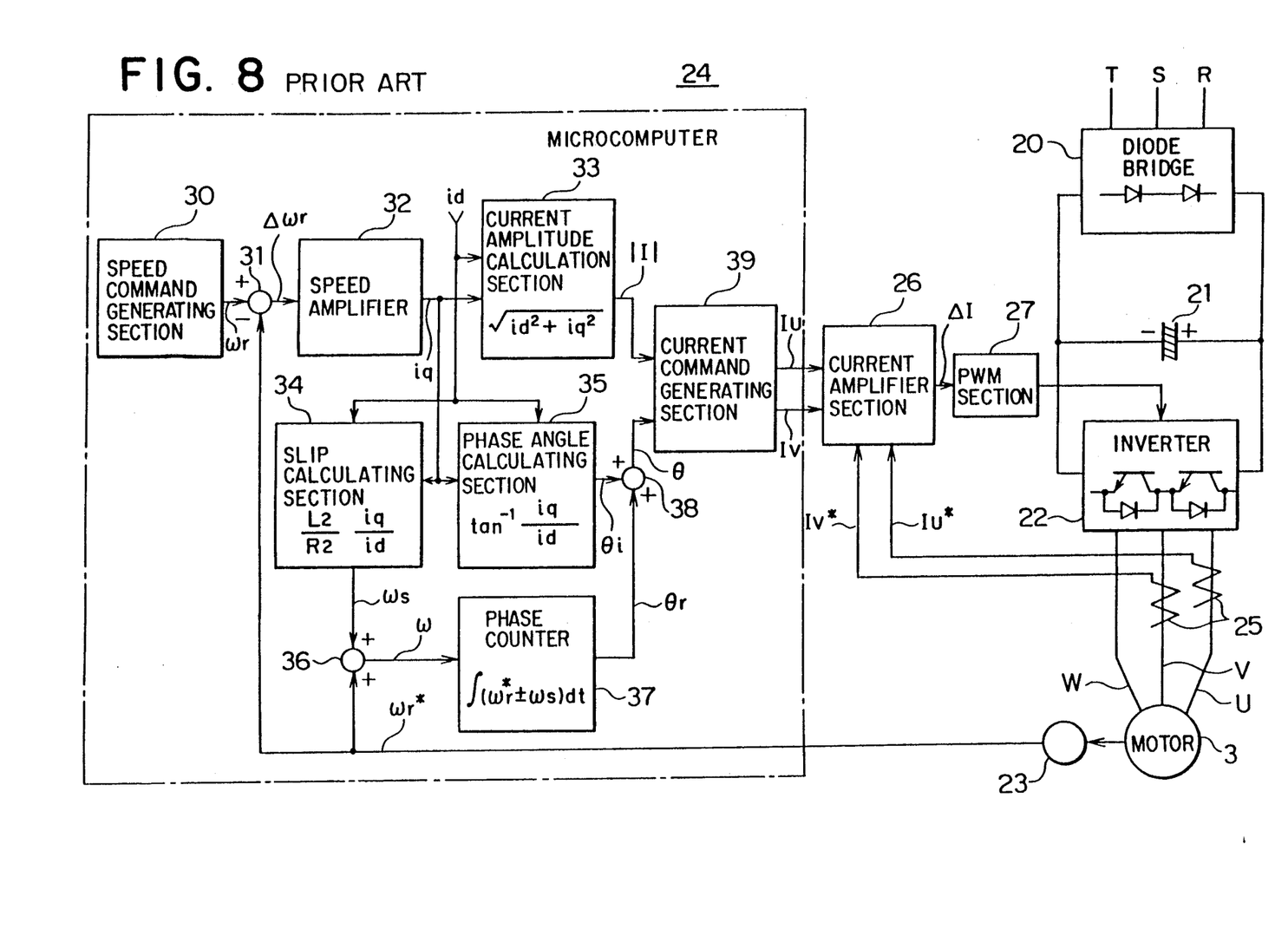
FIG. 8 is a block diagram showing a conventional apparatus for controlling an elevator door.

FIG. 8 shows the circuit arrangement of the conventional door controlling unit 2 for controlling the above-described elevator door system.

For example, a three-phase alternating current of 200 V or 220 V, which is input from a power source, is rectified by a diode bridge 20 and smoothed by a smoothing capacitor 21 to generate a dc voltage. The dc voltage is controlled to a sine-wave motor current by an inverter 22 comprising switching elements such as transistors, FETs or the like. During this control, the switching elements of the inverter 22 are subjected to pulse width modulation by the PWM pulse generated from a PWM section 27. In this way, the speed and torque of the door driving motor 3 are controlled.

The speed of the door driving motor 3 is detected by an encoder 23 provided on the motor shaft. The speed $\omega_r^*$ detected by the encoder 23 is subtracted from the speed command $\omega_r$ generated from a speed command generator 30 in a microcomputer 24 at a subtraction section 31 to determine a speed deviation $\Delta\omega_r$. When the speed deviation $\Delta\omega_r$ is input to a speed amplifier 32, the amplifier 32 calculates torque necessary for the door driving motor 3 in accordance with the speed command $\omega_r$ and inputs to a slip calculating section 34 a torque command, i.e., a current iq corresponding to the torque and a current command id corresponding to excitation, which is generally a constant value within a constant torque region. The slip calculating section 34 generates a slip frequency $\omega_s$. The slip frequency $\omega_s$ is added to the speed $\omega_r^*$ detected by the encoder 23 at a first addition section 36 and then input to a phase counter 37 serving as an integrator. In the phase counter 37, the rotational angle of the driving motor 3 is calculated by the equation, $\theta_r = \int(\omega_r^* \pm \omega_s)\,dt$.

The phase angle $\theta i$, which is calculated from the current iq corresponding to the torque and the current command id corresponding to excitation by a phase angle calculating section 35, is added to the rotational angle $\theta_r$ of the magnetic field at a second addition section 38 to determine an actual current phase angle $\theta = \theta_r + \theta i$. From the phase angle $\theta$ and the current amplitude $|I|$ generated from a current amplitude calculating section 33, a current command generating section 39 generates a U-phase current command $I_u = |I| \cdot \sin\theta$ and a v-phase current command $I_v = |I| \cdot \sin(\theta + 2/3\,\pi)$. From the current commands and the actual motor currents $I_u^*, I_v^*$, which are respectively detected by dc CTs 25, deviations $\Delta I_u, \Delta I_v$ and $\Delta I_w = -\Delta I_u - \Delta I_v$ are determined by a DC amplifier 26. A three-phase PWM voltage command corresponding to the three deviation values is generated from the PWM section 27. The pulse train is supplied to the inverter 22 so as to actuate the switching elements thereof. This permits the current, voltage and frequency of the door driving motor 3 to be respectively controlled to predetermined values. The above-described series of operations control the rotational speed and the torque of the door driving motor 3.

Figure 9:
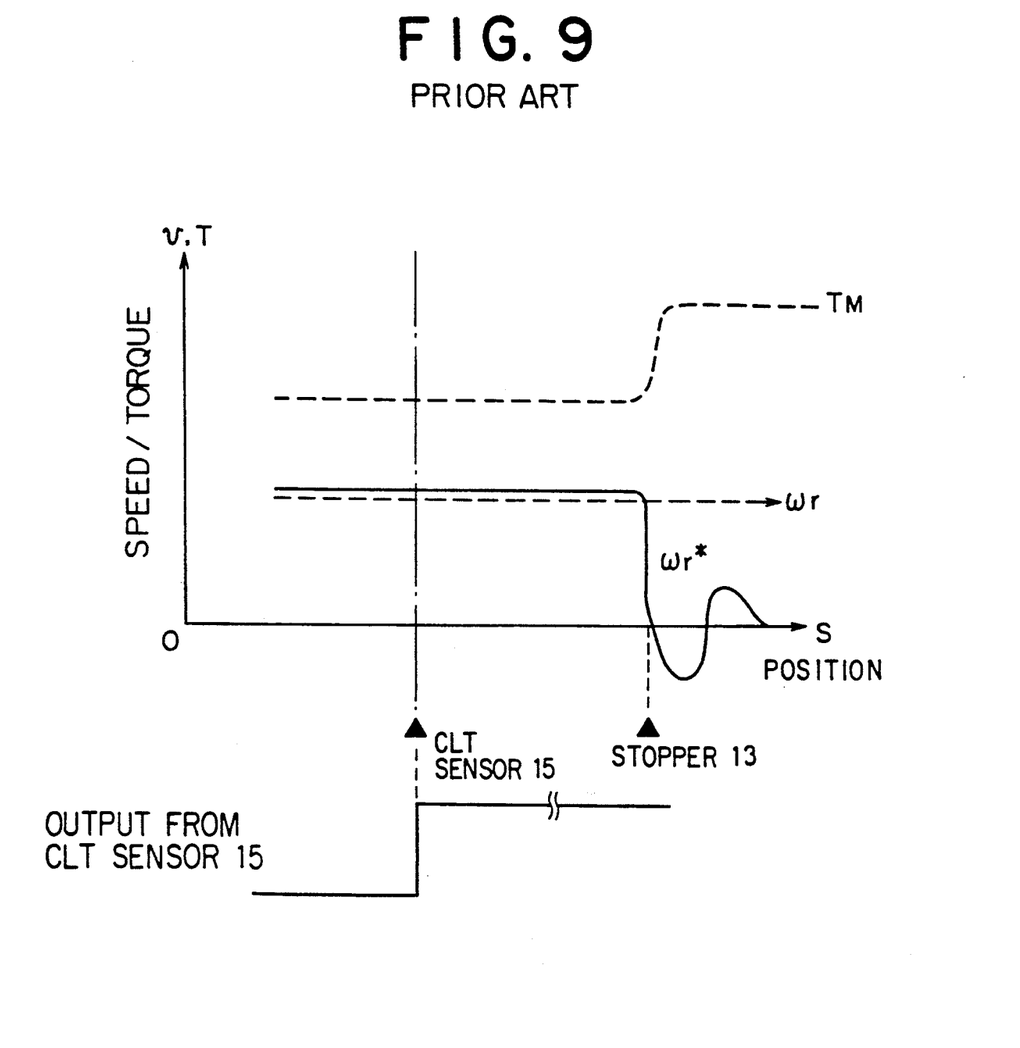
FIG. 9 is a drawing showing the torque characteristics and the motor speed in the apparatus for controlling a door shown in FIG. 8.

For example, as shown in FIG. 9, the door 6 is controlled by pressing the door stopper 16 against the stoppers 12 and 13, both of which are made of an elastic material, with predetermined torque at the opening and closing ends of the door 6.

The above conventional elevator door controlling unit has the problem that the door 6 is pushed back by the reaction force of the stopper 13 at the moment the door stopper 16 collides with the stopper 13 and produces vibration setting of the actual speed $\omega_r^*$ even if the speed command $\omega_r$ is constant, as shown in FIG. 9.

The elevator door controlling unit also has the problems that, when the closed door is forced open by tampering or the like, the actual speed $\omega_r^*$ cannot be easily correctly detected because it is a low value, and the reaction force to prevent the door from being forced open cannot be easily generated, and that heat is generated from the motor if the current at the time the door stopper 16 is pressed against the stopper 13 is increased.

SUMMARY OF THE INVENTION

The present invention has been designed to solve the above problems, and it is an object of the present invention to provide an apparatus for controlling an elevator door which is capable of satisfactorily setting the speed at the ends of the door and increasing the reaction force when the door is forced open.

An apparatus for controlling an elevator door in accordance with the present invention comprises a motor for opening and closing an elevator door, an inverter unit for controlling the driving of the motor, door position detecting means for detecting the position of the door, first and second sensors for respectively detecting that the door passes through reference points at the opening and closing ends, speed command generating means for generating a speed command based on the distance from the door position detected by the door position detecting means when one of the first and second sensors detects the passage of the door to opening-side and closing-side stop target points, and control means for controlling the inverter unit on the basis of the speed command output from the speed command generating means.

DESCRIPTION OF THE PREFERRED EMBODIMENTS

Embodiments of the present invention are described below with reference to the drawings.

Figure 1:
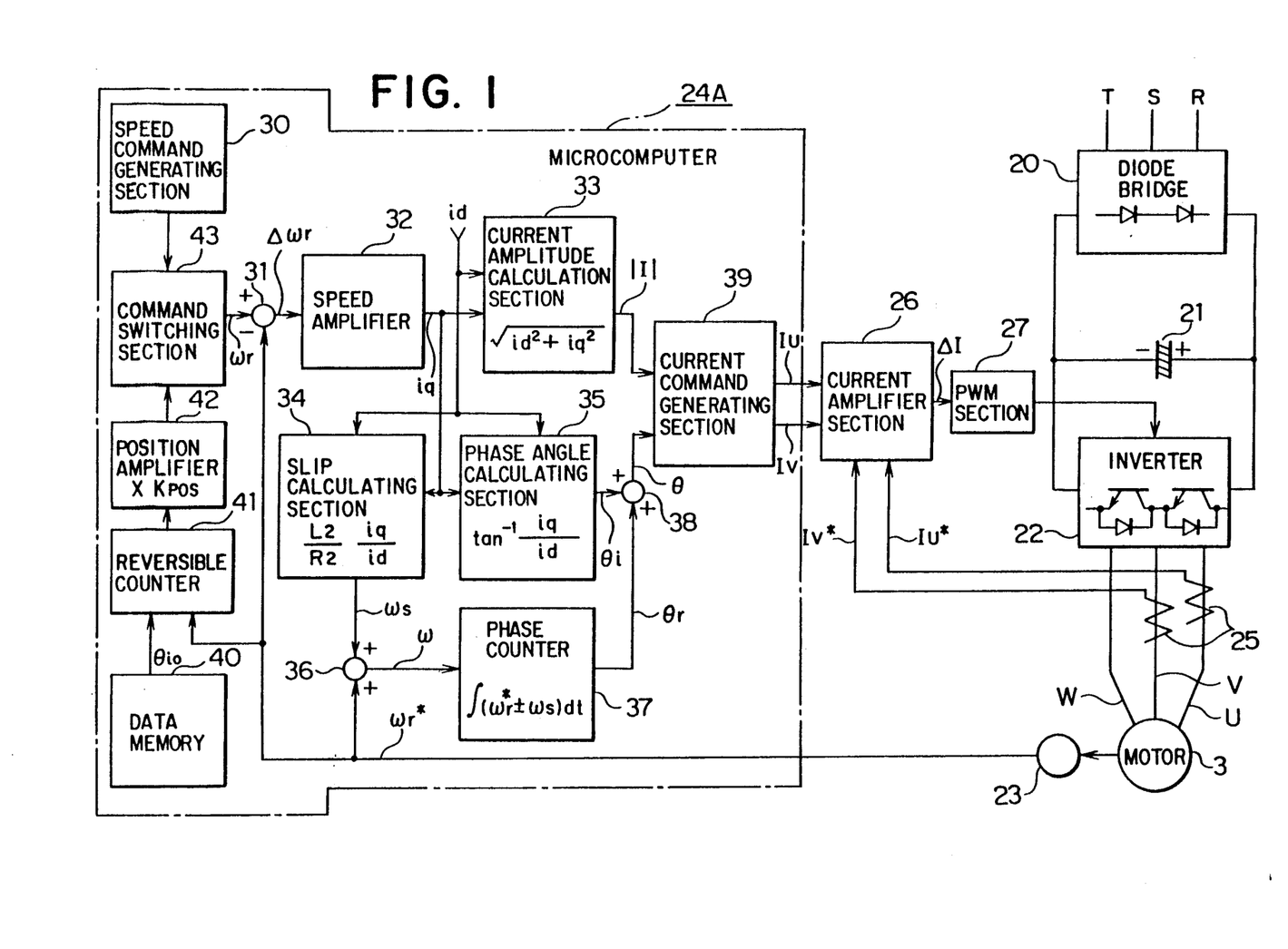
FIG. 1 is a block diagram of an apparatus for controlling an elevator door in accordance with an embodiment of the present invention.

In the door controlling apparatus shown in FIG. 1 a microcomputer 24A is connected to an encoder 23 and a current amplifier section 26. The microcomputer 24A is the same as the microcomputer 24 shown in FIG. 8 with the exception that a command switching section 43 is interposed between the speed command generating section 30 and the subtraction section 31, and a position amplifier 42 and a reversible counter 41 are connected in series between the command switching section 43 and the input terminal from the encoder 23, data memory 40 being further connected to the reversible counter 41.

The door controlling apparatus in this embodiment is applied to the door system shown in FIG. 7. Fixed-value remainder data $\theta_{i0}$ which is obtained by converting the moving length of the door 6 from the OLT sensor 14 to a position just ahead of the door stopper 12 on the opening side or from the CLT sensor 15 to a position just ahead of the door stopper 13 on the closing side into the number of pulses from the encoder 23 is previously stored in the data memory 40. The reversible counter 41 counts the pulses output from the encoder 23 to determine the position $\theta_i^*$ of the door 6 detected by the OLT sensor 14 or the CLT sensor 15. The reversible counter 41 also subtracts the position $\theta_i^*$ from the fixed-value remainder data $\theta_{i0}$ which is stored in the data memory 40 so as to output the distance $\theta_{i0} - \theta_i^*$ to a position just ahead of the door stopper 12 or 13.

The position amplifier 42 has a gain $K_{pos}$ and outputs the value $K_{pos}(\theta_{i0} - \theta_i^*)$ as the speed command $\omega_r$ to the command switching section 43. The command switching section 43 selects the output from the speed command generating section 30 until one of the terminal sensors such as the OLT sensor 14 and the CLT sensor 15 is operated. After one terminal sensor has been operated, the command switching section 43 selects the output from the position amplifier 42 and outputs as the speed command $\omega_r$ the command selected to the subtraction section 31.

Figure 2:
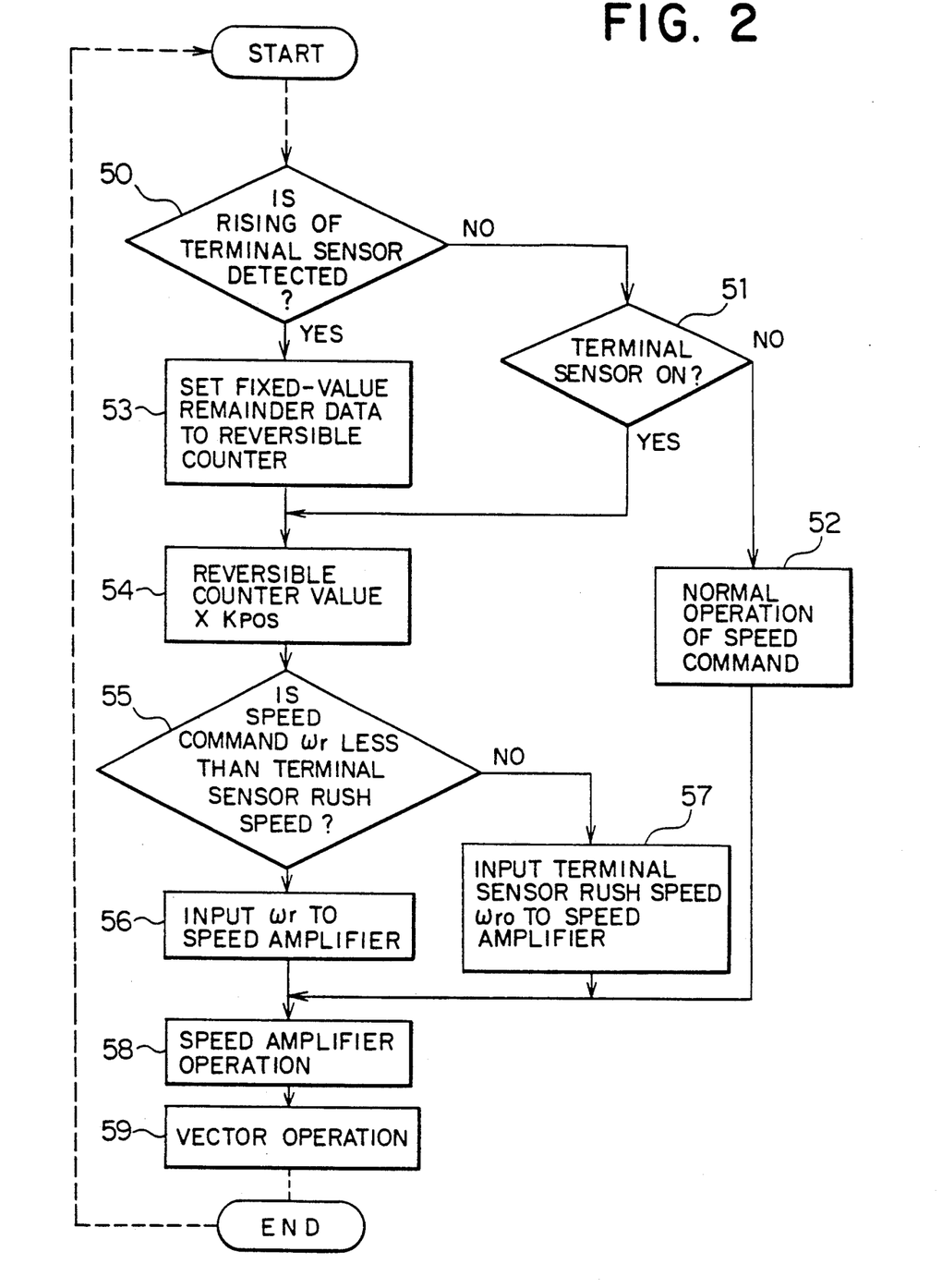
FIG. 2 is a flow chart showing the operation of the embodiment shown i FIG. 1.

A description will be made of the operation of the embodiment with reference to the flow chart shown in FIG. 2. In Step 50, a decision is first made as to whether or not the rising of the terminal sensor is detected. If the rising is not detected, the flow goes to Step 51 in which a decision is made as to whether or not the terminal sensor is operated. If it is decided that the terminal sensor is not operated, a speed command is normally calculated in Step 52. Namely, the command switching section 43 selects output from the speed command generating section 30 and inputs the speed command $\omega_r$ generated in the speed command generating section 30 to the subtraction section 31. The torque current $i_q$ is then calculated by the speed amplifier 32 in Step 58 by the same method as that employed in the conventional example shown in FIG. 8, and vector operation is then made in Step 59. In this way, a three-phase PWM voltage command is output to the inverter 22 from the PWM section 27 so that the inverter 22 is controlled according to the speed command $\omega_r$ generated from the speed command generating section 30.

If the rising of the terminal sensor is detected in Step 50, the flow moves to Step 53 in which the fixed-value remainder data $\theta_{i0}$ stored in the data memory 40 is set in the reversible counter 41. In Step 54, the output $\theta_{i0} - \theta_i^*$ from the reversible counter 41 is then increased $K_{POS}$ times by the position amplifier 42 to generate the speed command $\omega_r$. In Step 55, a decision is made as to whether or not the speed command $\omega_r$ is less than the terminal sensor rush speed $\omega_{r0}$ which is previously set. As a result of the decision, if $\omega_r \leq \omega_{r0}$, the command switching section 43 inputs to the subtraction section 31 the speed command $\omega_r$ output from the position amplifier 42 in Step 56. While if $\omega_r > \omega_{r0}$, the command switching section 43 inputs the terminal sensor rush speed $\omega_{r0}$ to the subtraction section 31 in Step 57.

If it is decided in Step 50 that the rising of the terminal sensor is not detected and in subsequent step 51 that the terminal sensor is operated, it is decided that the fixed-value remainder data $\theta_{i0}$ has been already set in the reversible counter 41, and the flow moves to Step 54 in which the speed command $\omega_r$ is output from the position amplifier 42.

The inverter 22 is controlled in the above-described manner, and a current is supplied from the inverter 22 to the motor 3 so as to drive the motor at a desired speed.

The output $\theta_{i0} - \theta_i^*$ from the reversible counter 41 is subjected to addition or subtraction by the feedback pulse output from the encoder 23 so as to converge to zero. Since the output $\theta_{i0} - \theta_i^*$ and the speed command $\omega_r$ output from the position amplifier 42 have the relation shown in FIG. 3, the speed command $\omega_r$ also converge to zero. Namely, the speed of the elevator door 6 is decreased in such a manner that the actual speed $\omega_r^* = 0$ when the door stopper 16 is placed at a position just ahead of the stopper 13 or 12, as shown in FIG. 4. In FIG. 4, the broken line shows the torque $T_M$ of the motor 3.

Figure 3:
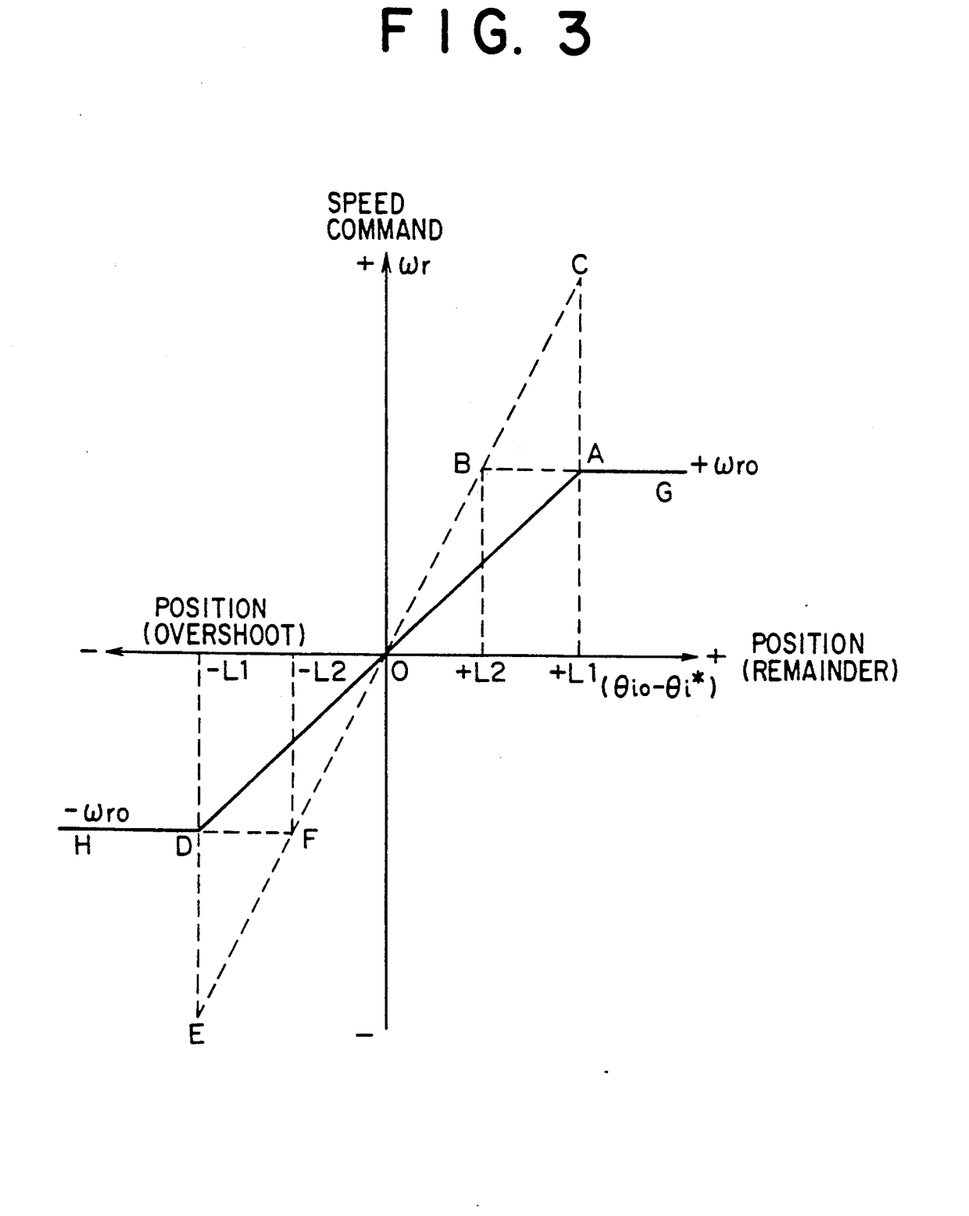
FIG. 3 is a drawing showing a relation between the door position and the speed command in the embodiment shown in FIG. 1.
Figure 4:
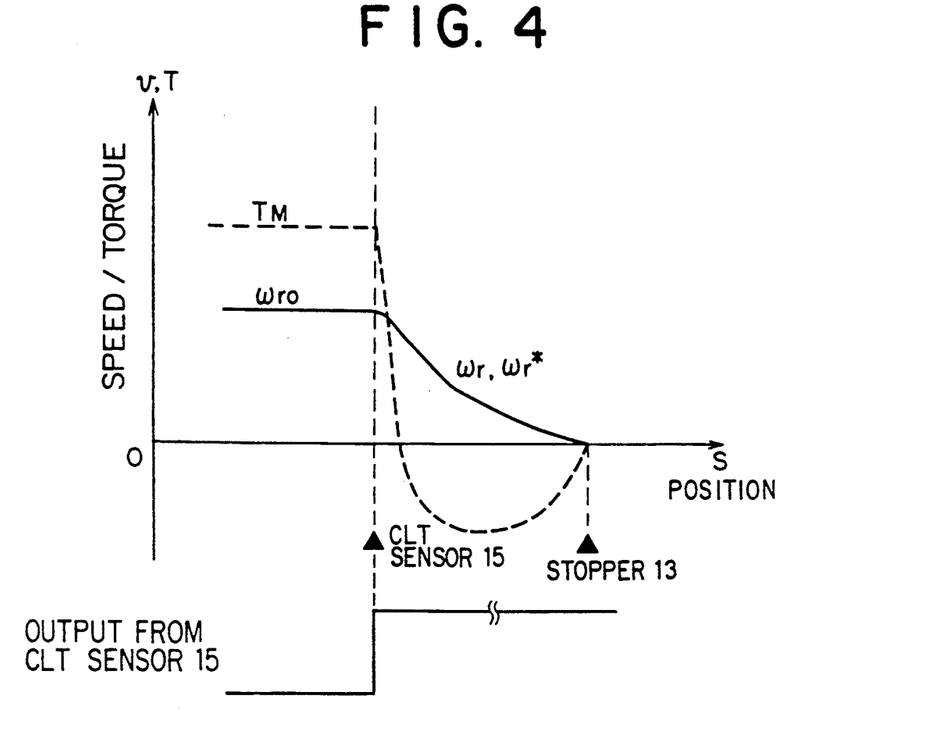
FIG. 4 is a drawing showing the torque characteristics and the motor speed in the embodiment shown in FIG. 1.

In FIG. 3, when the position $\theta_{i0} - \theta_i^*$ (a remainder to a position just ahead of the stopper 13 or 12) passes through zero, i.e., when the door stopper 16 is brought into contact with the stopper 13 or 12 and pressed against it, since the polarity of the speed command $\omega_r$ is reversed, the opening and closing of the door 6 are controlled so that the position $\theta i_0 - \theta i^*$ converges to zero.

For example, assuming that the position loop gain of the reduction pattern G-A-O shown by the the solid line in FIG. 3 is $K_{pos}$, and that the remainder at the start of reduction is L1, $\omega_r = K_{pos} \cdot (\theta i_0 - \theta i^*)$ and $\omega_{r0} = K_{pos} L1$ within the range of $|(\theta i_0 - \theta i^*)| \leq L1$. When the position passes through the origin which is a target point, since $(\theta i_0 - \theta i^*) \leq 0$, the speed command $\omega_r$ is also negative. In this case, the pattern H-D-O shown in FIG. 3 is obtained. When the position loop gain is increased o $K_{pos} 1$ ($> K_{pos}$), the speed at the point $+L1$ is greater than the terminal sensor rush speed $\omega_{r0}$, for example, reaches the point C. The pattern of the speed command $\omega_r$ is therefore shown by G-A-C-B-O in which the point A is jumped to the point C.

If the relation $\omega_r = K_{pos} \cdot (\theta i_0 - \theta i^*) \leq \omega_{r0}$ is constantly established, no jump is produced in the speed command $\omega_r$ even if the position loop gain is changed. When the position loop gain is increased to the above value $K_{pos}1$, the speed command is calculated so that $\omega_r = K_{pos}1 (\theta i_0 - \theta i^*) \leq \omega_{r0}$. Namely, in FIG. 3, the reduction starting point is the point $+L2$, and the speed command $\omega_r$ is reduced along the pattern G-A-B-O. When the position passes through the origin, the pattern in the overshoot direction is shown by O-F-D-H in FIG. 3. This calculation is made in Steps 55 and 57 shown in FIG. 2.

Figure 5:
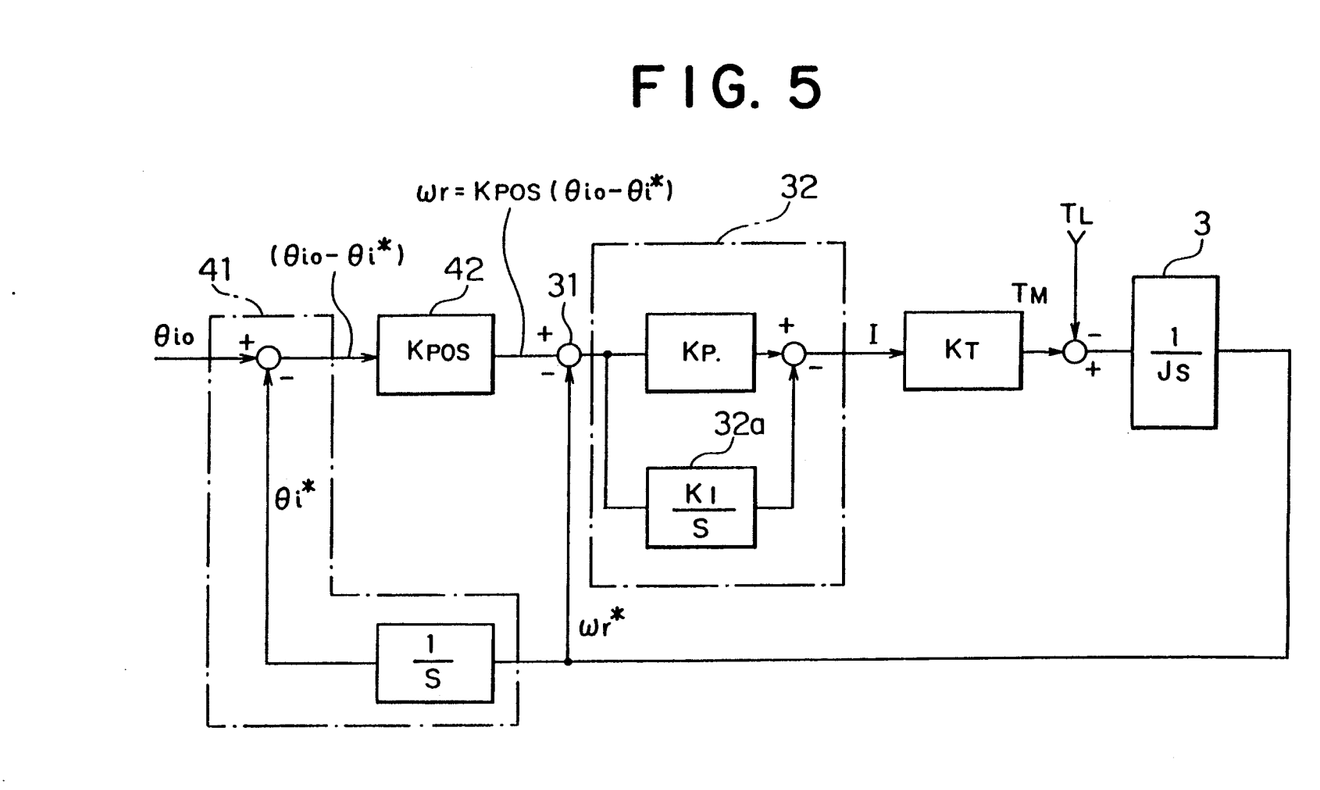
FIG. 5 is a block diagram showing a control system equivalent to the embodiment shown in FIG. 1.

FIG. 5 shows the block diagram of an automatic control system equivalent to the door controlling apparatus according to the embodiment. A speed amplifier 32 is generally subjected to PI control and has a great force to return the position to the target value even if the position amplifier 42 produces positional error because it contains an integrator 32a.

As described above, the embodiment enables the driving of the motor 3 to be controlled so that the distance from the door stopper 16 of the elevator to the stop target point provided at a position just ahead of the door stopper 12 or 13 is zero. The door 6 is thus at the position just ahead of the stopper 12 or 13 without colliding with stopper at the opening and closing ends. It is therefore possible to prevent the generation of sound by door stopping when the door is opened and closed and the vibrations of the door 6. In addition, since the reaction force which has the maximum torque determined by the driving capacity of the motor 3 and the inverter 22 is generated for preventing the door 6 from being forced open, the safety is improved.

Figure 6:
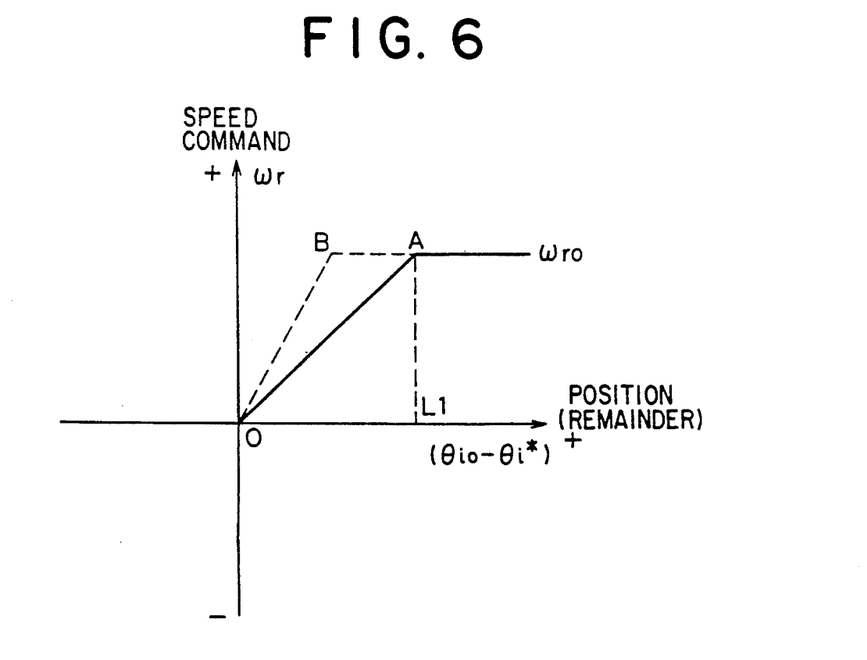
FIG. 6 is a drawing showing a relation between the door position and the speed command in another embodiment.

When the door stoppers 12 and 13 are provided, as shown in FIG. 7, it is unnecessary to consider the overshoot position. For example, when the position $(\theta i_0 - \theta i^*) \leq 0$, as shown in FIG. 6, the characteristics of the position amplifier 42 may be set so that the speed command $\omega_r$ is zero. This method has the advantage that even if the reversible counter 41 is mistakenly operated when the door 6 is stopped at the opening and closing ends, the movement of the door 6 is not started.

What is claimed is:

1. An apparatus for controlling an elevator door comprising:
   a motor for opening and closing an elevator door;
   an inverter unit connected to said motor which controls the driving of said motor;
   door position detecting means connected to said motor for detecting the position of the door;
   first and second sensors connected to said door position detecting means which respectively detect that said door passes through a terminal reference point on an opening side and a terminal reference point on a closing side;
   speed command generating means for generating a door speed command on the basis of a distance between the door position detected by said door position detecting means to a stop target position on the opening side or the closing side when said first and second sensors respectively detect the passage of said door by the opening and closing side terminal reference points; and
   control means for controlling said inverter unit on the basis of the speed command output from said speed command generating means.

2. An apparatus for controlling an elevator door according to claim 1, wherein said door position detecting means comprises an encoder connected to a shaft of said motor 3. An apparatus for controlling an elevator door according to claim 1, further comprising opening- and closing-side stoppers, the opening-side stop target position and closing side stop target position being set at positions just ahead of said opening-side stopper and said closing-side stopper, respectively.

4. An apparatus for controlling an elevator door according to claim 1, wherein said speed command generating means includes the function of outputting a speed command which is proportional to a distance between the door position detected by said door position detecting means and the opening-side stop target position or the closing-side stop target position.

5. An apparatus for controlling an elevator door according to claim 1, wherein said speed command generating means includes the function of outputting zero as a speed command when said door passes through the opening-side stop target position or the closing-side stop target 6. An apparatus for controlling an elevator door according to claim 4, wherein said speed command generating means includes the function of outputting as the maximum speed command the speed when said door passes through the opening-side terminal reference point or the closing-side terminal reference point.

7. An apparatus for controlling an elevator door comprising:
   a motor for opening and closing an elevator door;
   an inverter unit connected to said moor which controls the driving of said motor;
   an encoder connected to said motor which generates pulses indicative of the speed of said motor;
   door position detecting means connected to said encoder for detecting a position of the door;
   first speed command generating means for generating a speed command for the door, said first speed command generating means being connected to said door position detecting means;
   second speed command generating means for generating a speed command for the door;
   a command switching means connected to said first and second speed command generating means for transmitting the speed command generated by said first speed command generating circuit when a determined door position is detected by said door position detecting means; and
   control means for controlling said inverter unit on the basis of the speed command output from said command switching means.

8. An apparatus for controlling elevator doors as claimed in claim 7 wherein said door position detecting means includes a reversible counter connected to a data memory.

9. An apparatus for controlling elevator doors as claimed in claim 7 wherein said first speed command generating means includes a position amplifier.

* * * * *

UNITED STATES PATENT AND TRADEMARK OFFICE
CERTIFICATE OF CORRECTION

PATENT NO. : 5,250,765
DATED : October 5, 1993
INVENTOR(S) : Mizuno et al.

It is certified that error appears in the above-indentified patent and that said Letters Patent is hereby corrected as shown below:

Claim 2, column 6, line 14, after "moto" insert
--.--.

Claim 3, column 6, line 18, change "closing side" to --closing-side--.

Claim 5, column 6, line 32, after "target" insert --position--.

Signed and Sealed this

Nineteenth Day of April, 1994

Attest:

BRUCE LEHMAN

Attesting Officer      Commissioner of Patents and Trademarks